United States Patent Office 2,873,951
Patented Feb. 17, 1959

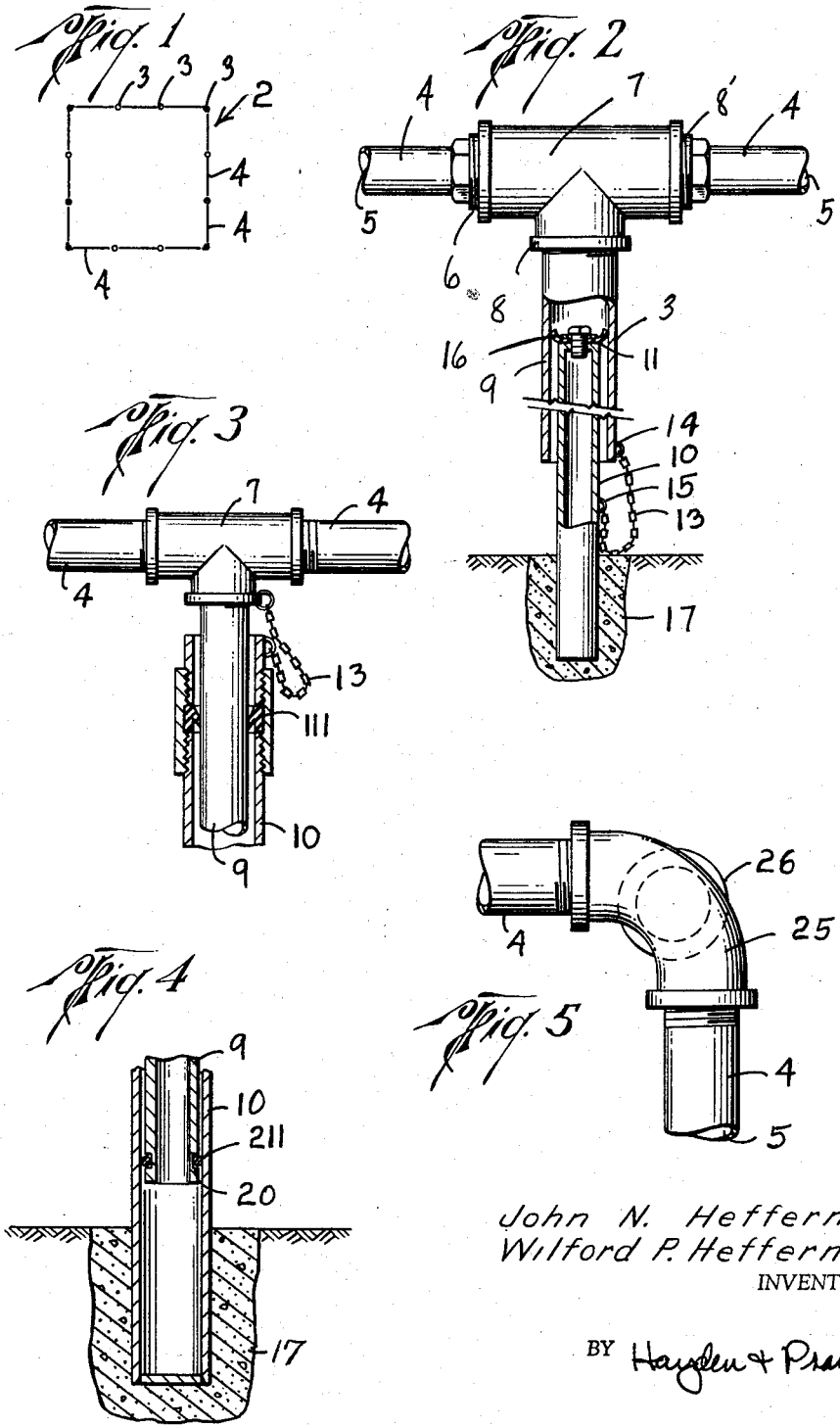

2,873,951

FENCE LIFTER

John N. Heffernan and Wilford P. Heffernan, Angleton, Tex., assignors to The Hydrofence Corporation, a corporation of Texas Application April 19, 1957, Serial No. 653,932

4 Claims. (Cl. 256—25)

The present invention relates to a construction and arrangement for lifting a fence to gain access therebeneath.

It is extremely difficult to maintain a neat appearance of a grass covered yard which is surrounded by a fence. Various devices such as edgers and the like have been proposed for cutting grass in close proximity and immediately beneath a fence, but all of such devices are disadvantageous in that they are bulky and difficult to move about and are not completely satisfactory in their function of cutting grass adjacent or beneath a fence or the like.

The present invention is directed to a construction and arrangement whereby a fence may be raised a suitable height above the ground so that access may be gained therebeneath for cutting of grass and weeds, and thereafter the fence lowered to its original position.

Still a further object of the present invention is to provide a relatively simple construction, yet one which is efficient in its operation, for accomplishing the desired result of raising a fence with a minimum of efforts so that the grass and weeds may be cut therebeneath, and thereafter which fence may be lowered to its original position until reactivated.

Still a further object of the present invention is to provide a hydraulic arrangement for lifting a fence so that the fence can be raised a suitable height to pass a mower or the like thereunder for cutting weeds or grass beneath the fence, which construction permits the fence to thereafter seek its original position relative to the ground.

Yet a further object of the present invention is to utilize the components of a fence as fluid conductors for supplying the fluid to the fence post in a predetermined manner so that the fence supported by the post and the connecting rods between the post may be raised for gaining access therebeneath to cut grass and weeds.

Other objects and advantages of the present invention will become more readily apparent from a consideration of the following description and drawings wherein:

Fig. 1 represents a schematic illustration showing a fence enclosing a yard;

Fig. 2 is a sectional view, partly in elevation, illustrating one embodiment of the present invention, and showing the fence post members positioned vertically or relative to the ground and in movable relation relative to each other so that the fence is supported thereon and by the connecting rods between the fence post may be moved by fluid pressure supplied to the fence post;

Fig. 3 is an elevational view of the upper part of the fence post and connecting rods, which view is partly in section to illustrate an alternate embodiment of the seal means arrangement in the fence post;

Fig. 4 is a vertical sectional view of the lower end of a fence post construction, showing still another modification of a seal means which may be used in accomplishing the results of the present invention; and, Fig. 5 is a top plan view showing the manner of construction at the corner of the fence.

Attention is directed to Fig. 1 wherein the fence generally designated by the numeral 2 is illustrated as including a plurality of fence posts 3 which are arranged at suitably spaced intervals, depending upon the type fence and the height thereof. The fence posts are interconnected by means of at least one rod 4 which is arranged adjacent the top of the fence and extends substantially horizontally relative to the vertical fence post 3.

This relationship is more clearly illustrated in Fig. 2 wherein the connecting rods 4 are illustrated as being in the form of hollow tubular members 5 which are secured by any suitable means such as the threaded connections 6, into the T connection 7, which also is provided with an opening as illustrated at 8 for engagement with the fence post illustrated at 3. The rod 4 is connected into the other side of the T by means of the threaded connection 8 which is in all respects similar to the threaded connection 6, and thus the rods 4 are interconnected with each of the fence posts, and in the form illustrated in the present invention, such rods form conduits for a purpose to be more particularly described hereinafter.

The fence post 3 includes the movable cylinder member 9 and the stationary piston member 10 which are arranged in telescoping relation relative to each other to accommodate relative movement therebetween. Additionally seal means as illustrated generally at 11 in Fig. 2 are provided which engage between the telescoping cylinder member 9 and piston 10 to aid in accomplishing the function of the present invention.

Suitable means such as a rubber hose (not shown) or the like may be connected to a hydrant or water faucet in the yard and in turn secured to the conduit 5 as shown in Fig. 2 so as to supply fluid such as water under pressure thereto. When the water passes along the member 4 to each of the fence posts 3, such water will act against the seal means 11 in each of the fence posts and thereby effect relative movement between the telescoping members 9 and 10. This will cause the members 4 and 9 to move upwardly relative to the stationary member 10 so that access may be had beneath the fence for cutting of grass and weeds. In order to prevent the members 9 and 10 from moving completely out of telescoping relation, suitable means such as the chain 13 may be provided which is engaged as illustrated at 14 to the member 9 and at 15 to the member 10 to limit the amount of relative vertical movement between the telescoping members 9 and 10. Ordinarily the length of the chain 13 will be at least great enough to accommodate the passage of a mower beneath the fence for cutting of the grass and weeds.

It will be noted that as illustrated in Fig. 2 the seal means 11 is illustrated as being of the cup type and is shown as being secured by any suitable means such as the bolt 16 to the member 10 which is secured or fixed in the ground by any suitable means such as cement or the like as illustrated at 17.

If desired the seal means 11 may assume the form illustrated at 111 in Fig. 3 wherein a lip type of seal ring is shown as being mounted in the fixed member 10, which fluid type seal 111 serves the same purpose in function as the cup type fluid seal 11 of the Fig. 2 modification.

Still another modification of the fluid seal arrangement is illustrated in Fig. 4 wherein an O ring 211 is illustrated as being mounted in the groove 20 on the movable member 9. The function and operation of the seal arrangement illustrated in Fig. 4 is similar to that as previously described with regards to the seal arrangement shown in Figs. 2 and 3.

Regardless of which form of the invention illustrated, whether it is the modification illustrated in Fig. 2, or that shown in Fig. 3, or that shown in Fig. 4, when fluid, such as water, is passed through the horizontal connecting rod 4 to each of the spaced vertically extending fence posts 3, the fluid pressure is prevented from escaping through the fence posts by means of the seal 11 in Fig. 2, the seal 111 in Fig. 3, and the seal 211 in Fig. 4 modification. Thus vertical relative movement between the telescoping members 9 and 10 is effected so as to raise the fence supported on the connecting rods 4 and the vertical fence posts 3.

As previously mentioned it will be noted that the seal means in the Figs. 2 and 3 modifications is mounted or positioned in the stationary member 10 and is adapted to engage the movable member 9, whereas in the Fig. 4 modification the seal means 211 is mounted in the movable member 9 and is adapted to slide along the fixed member 10. However the Fig. 2 modification differs further from the Figs. 3 and 4 modifications in that in the Fig. 2 modification the fixed member 10 is related to the movable member 9, so that the movable member 9 surrounds the fixed member 10. In some circumstances it may be more desirable to provide an arrangement wherein the movable member 9 is positioned within the fixed member 10 as shown in the Figs. 3 and 4 modifications. The function of the invention is the same in either arrangement, however in certain circumstances such as where the growth of the underbrush around the fence is rapid, it may be more desirable to provide an arrangement as that illustrated in Fig. 3 or 4, so that movement of the telescoping members will not become fouled by the growth of the underbrush adjacent the fence.

In Fig. 5 it will be noted that the members 4, which have been described herein as comprising hollow tubular members 5, are connected into an elbow as illustrated at 25. The elbow is further modified in that it is provided with a threaded connection as illustrated at 26 so that it may receive a fence post 3 therebeneath (not shown).

The present invention is particularly adaptable to use in homes where a fence of the "cyclone" or "hurricane" variety is provided. However, the invention may be applied with equal effect to any type fence provided that the water, or fluid pressure, for raising the fence is sufficient.

Additionally, the invention has further advantage in that it provides a relatively simple arrangement which may be mounted on fences that are already in existence with a minimum of modification. Of course, the primary advantage of the device after it has been positioned on the fence, is that it permits the fence to be raised in situ, so that growth around and immediately beneath the fence may be eliminated without moving the fence laterally. After the fence has been raised and the growth cut, the water pressure can be cut off and the fence will move back to its original position adjacent the ground.

The present invention has been found completely satisfactory in use and it provides a novel economical manner of raising a fence with a minimum amount of effort and expenditure.

Broadly the invention relates to a construction and arrangement for raising a fence vertically relative to the ground whereby growth therebeneath may be cut, whereafter the fence may be lowered to its original position relative to the earth's surface.

What is claimed is:

1. A hydraulically operated fence including at least one fence post extending upwardly from the ground, said fence post including a piston member mounted in the ground and extending upwardly therefrom, a movable cylinder telescopically mounted on said piston member, seal means sealing between said cylinder and piston and a conduit attached adjacent the upper end of said cylinder whereby fluid pressure may be supplied to said conduit and to said cylinder for moving said cylinder relative to said piston member to lift the fence.

2. A hydraulically operated fence including a plurality of spaced fence posts extending upwardly from the ground, said fence posts including a piston member mounted in the ground, a movable cylinder telescopically mounted on said piston member, seal means sealing between said cylinder and piston, and a conduit attached adjacent the upper end of said cylinder whereby fluid pressure may be supplied to said conduit and to said cylinder for moving said cylinder relative to said piston member to lift the fence.

3. The combination recited in claim 1 including means secured to said cylinder means adjacent its end and to the adjacent end of said piston member to limit the movement between said cylinder and said piston member.

4. The combination recited in claim 2 including means secured to said cylinder means adjacent its end and to the adjacent end of said piston member to limit the movement between said cylinder and said piston member.

References Cited in the file of this patent

UNITED STATES PATENTS

| | | |
|---|---|---|
| 1,259,060 | West | Mar. 12, 1918 |
| 2,805,046 | Petterson | Sept. 3, 1957 |